Oct. 28, 1969 C. D. VISOS 3,474,962
SNAP-ACTING THERMOSTATIC GAS VALVE
Filed March 5, 1968 2 Sheets-Sheet 2
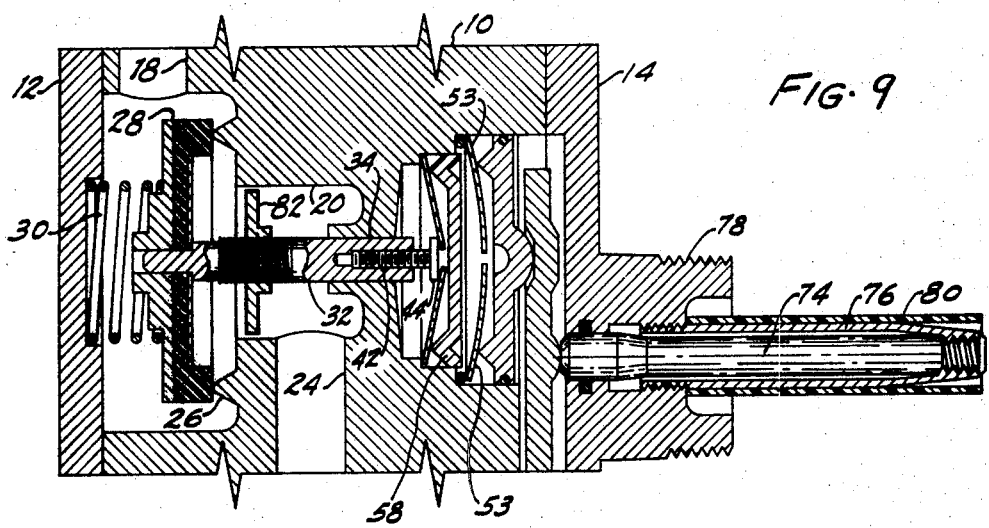
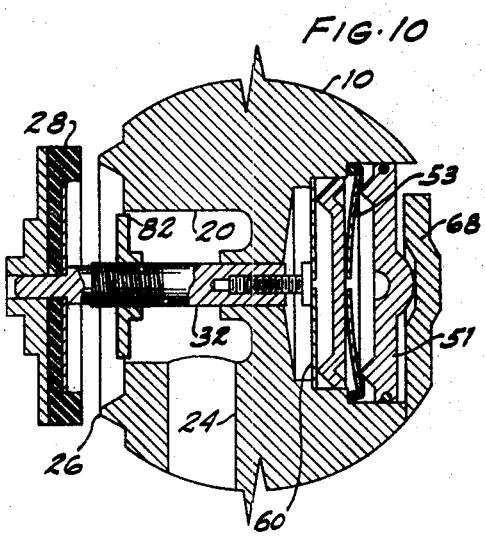
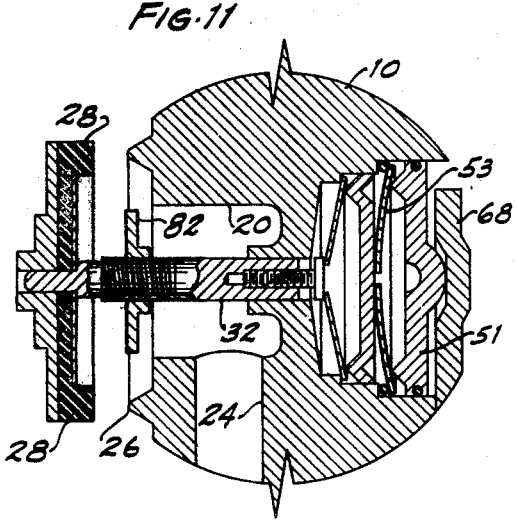
INVENTOR
CHARLES D. VISOS
BY Charles E. Markham
HIS AGENT United States Patent Office 3,474,962
Patented Oct. 28, 1969

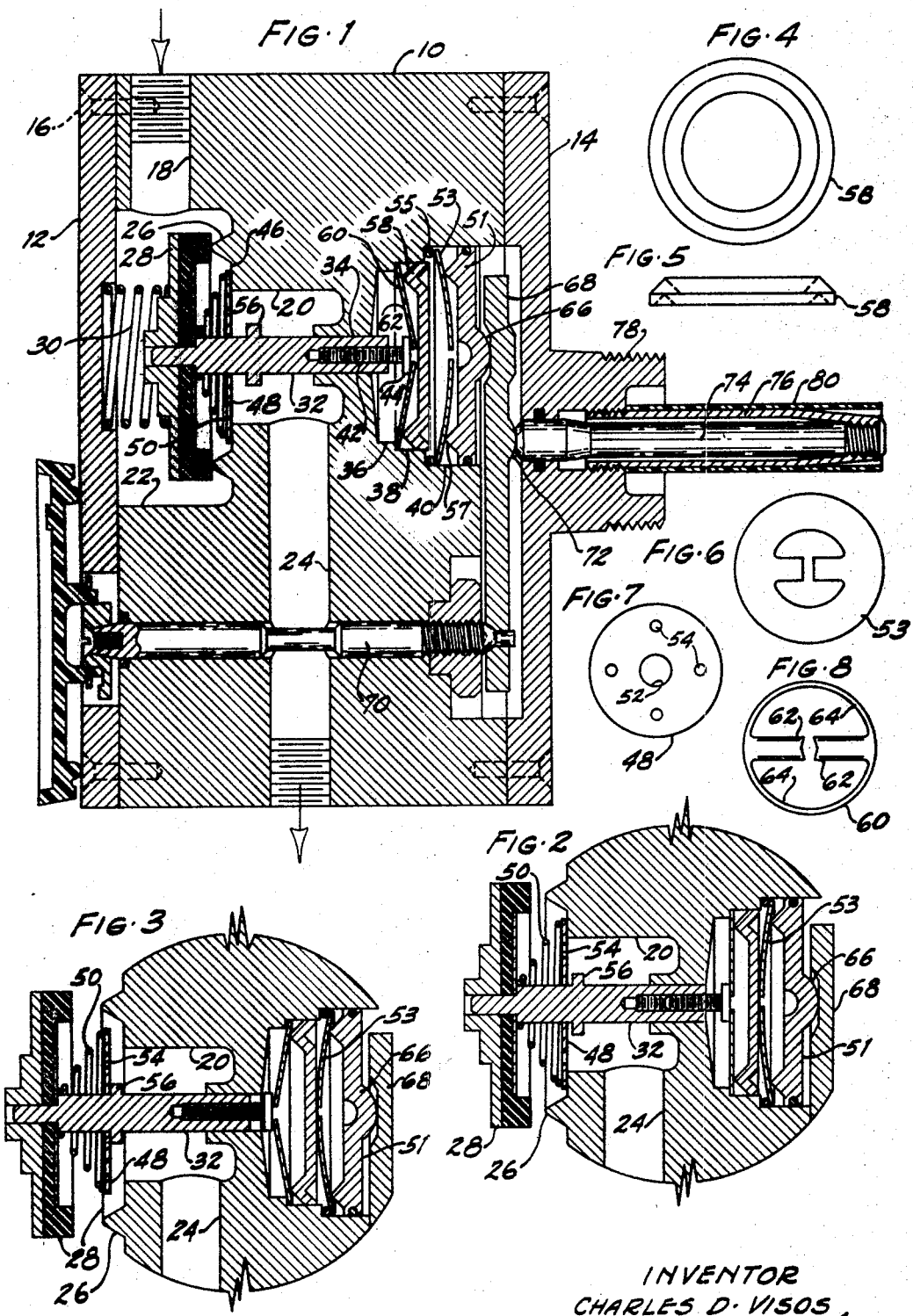

3,474,962
SNAP-ACTING THERMOSTATIC GAS VALVE
Charles D. Visos, St. Louis, Mo., assignor to Emerson Electric Co., St. Louis, Mo., a corporation of Missouri
Filed Mar. 5, 1968, Ser. No. 710,593
Int. Cl. G05d *23/10;* F16k *31/56*
U.S. Cl. 236—48
3 Claims

ABSTRACT OF THE DISCLOSURE

A thermostatically operated flow control device in which a biased closed poppet valve controlling flow from the end of a fluid passageways is opened an initial amount through snap disc action in response to a slight temperature change and is thereafter gradually moved further open in response to continued temperature change in the same direction; in which means movable axially relative to the end of the passageway to vary the flow has a normal position relative to the end of the passageway to limit the flow to a predetermined amount which is less than or at least not greater than it would be in the absence thereof when the valve is opened the initial amount; and in which the axially movable means moves with the valve to a less restricting position as the valve is moved openward beyond the initial amount.

---

When operating a thermostatically actuated valve through an initial opening movement from a biased closed position in response to a slight temperature change by interposing a snap action means such as a clicker disc between the thermostatic actuator and the valve, the precise amount of initial opening which occurs is difficult to control without a movement limiting means. The use of valve movement limiting means cannot, however, be employed if continued gradually opening movement of the valve in response to further temperature change through further flexing of the clicker disc by the thermostatic actuator is desired.

The use of two biased closed concentric valves one of which cooperates with a valve seat surrounding the end of a fluid passageway and the other of which cooperates with a concentric annular seat on the one valve to control an initial flow may be operated sequentially against different biasing springs and thereby permit the initial flow to be more closely controlled. Arrangements employing two valves in this manner are disclosed in United States Patents No. 3,159,346, issued Dec. 1, 1964, to M. J. Caparone et al., and No. 3,190,314, issued June 22, 1965, to C. D. Visos et al. In these arrangements both valves are required to seal perfectly upon their respective seats if all leakage is to be avoided, which is obviously desirable, particularly when the devices are used to control the flow of fuel gas.

The present invention has for an object the provision of a thermostatically operated flow control device which functions to permit a closely controlled initial flow therethrough in response to a slight temperature change, to permit gradually increased flow therethrough beyond the initial flow when the temperature continues to change in the same direction, and to completely cut off all flow in response to a temperatume change in the opposite direction, and in which all flow passes a single valve seat controlled by a single valve.

More specifically, it is an object to provide a thermostatically operated control device in which a single biased closed poppet valve, cooperating with a valve seat surrounding the end of a fluid passageway through the body of the device, is moved rapidly openward an initial amount through a snap disc in response to a slight temperature change and is thereafter moved gradually further openward if the temperature continues to change in the same direction; in which axially movable means operative to variably restrict flow from said passageway as it is moved relative to the end thereof has a normal position relative to the end of said passage to closely control a predetermined flow; in which the initial rapid opening movement of said valve is at least sufficient to permit said closely controlled predetermined flow; and in which said axially movable means moves with said valve axially to a less restricting position as said valve is moved gradually further openward beyond said initial amount in response to continued temperature change.

Other objects and advantages will appear from the following description and accompanying drawings.

FIG. 1 is a cross-sectional view of a thermostatically actuated valve constructed in accordance with the present invention;

FIG. 2 is a fragmentary cross-sectional view showing an operative position of the device with the valve in its initial open position and the restricting means in its normal biased position;

FIG. 3 is a fragmentary cross-sectional view showing an operative position with the valve moved openward beyond its initial opening position and the restricting means moved to a less restricting position;

FIGS. 4 and 5 are plan and side elevational views, respectively, of the rigid disc component of the motion multiplying means;

FIG. 6 is a plan view of the snap disc or clicker disc;

FIG. 7 is a plan view of the axially movable restricting element;

FIG. 8 is a plan view of the flexible disc component of the motion multiplying means;

FIG. 9 is a fragmentary sectional view of a device constructed in accordance with the present invention, showing a modified form of the axially movable restricting element;

FIG. 10 is a fragmentary sectional view showing the valve of FIG. 9 in its initial open position and the axially movable restricting element in its greatest restricting position; and FIG. 11 is a similar view showing the valve moved openward beyond its initial open position and the restricting element moved to a less restricting position.

The device to be described in particularly adapted to control the flow of gas to the gas burner of a hot water heater in accordance with requirements to maintain a preselected water temperature and to recover this temperature quickly when an unusually large draw off of heated water occurs. It will be apparent, however, that the device, with slight modification, may be readily adapted to other uses.

Referring to the drawings, FIGS. 1 to 8, numeral 10 indicates a valve body having a front plate 12 and a rear plate 14. Plates 12 and 14 are attached to the body member 10 by screws 16. The body is provided with an inlet passage 18, a valve chamber comprising a bore 20 and a counterbore 22, and an outlet passage 24. The bore and counterbore 22 forming the valve chamber extend inwardly from the front face of the valve body 10 and, respectively, intersect the outlet and inlet passages 24 and 18. A raised annular valve seat 26 formed in the bottom of counterbore 22 surrounding the open end of bore 20. The raised annular valve seat 26 is engaged by a poppet valve 28 which is biased in a closed position on the seat by a spring 30 acting between the body plate 12 and the valve.

The valve 28 is provided with a stem 32 which passes through and is guided in a bore 34 extending through the body 10 from the bottom of bore 20 to a concentric chamber on the rear side of the body comprising three stepped counterbores 36, 38, and 40 entering the rear side of the body. The outer end of valve stem 32 is rigidly attached to valve 28 by riveting, and its inner end, which normally extends into the counterbore 36, is provided with an axial adjustment screw 42 having a head 44.

The raised annular valve seat 26 is of somewhat larger diameter than the bore 20, leaving an annular flat surface 46 between valve seat 26 and the wall of bore 20 against which is biased the peripheral portion of a perforated circular disc 48. The disc 48 is biased against the surface 46 by a relatively light spring 50 acting between the disc 48 and the adjacent side of valve 28. The disc 48 has a central aperture 52 which slidably receives the valve stem 32 and a plurality of space apertures 54 which in total permit a predetermined flow from inlet 18 to outlet 24 when valve 28 is opened an initial amount, as indicated in FIG. 2. The portion of valve stem 32 extending through the bore 20 is provided with a collar 56 which, when valve 28 moves openward beyond the position shown in FIG. 2, engages the disc 48 and moves it outward from contact with surface 46 as shown in FIG. 3. As the disc 48 is moved outward from the surface 46 the flow from inlet 18 to outlet 14 is permitted to increase.

Slidably mounted in the counterbore 40 is a relatively thick, rigid, circular disc member 51. Between disc 51 and the bottom of counterbore 40 is a relatively thin disc 53 having meniscus form and arranged with its convex surface facing outward. Disc 53 is poised between a circular wire element 55 engaging the disc along a line very near its edge on one side thereof and an annular knife edge 57 formed on the inner surface of member 51 engaging the disc on its other side along a line spaced slightly inward from the line of engagement of wire element 55, so that only a slight inward axial movement of member 51 is required to cause disc 53 to snap through a planar shape to an opposite meniscus form.

Sildably mounted in counterbore 38 is a rigid circular disc 58 and between disc 58 and the bottom of counterbore 38 is a motion multiplying member 60, see FIG. 8. The member 60 has a pair of lever arms 62 which are joined by relatively flexible arcuate portions 64. The arcuate portions 64 lie against the bottom of counterbore 38 and the lever arms 62 extend radially inward at an angle. The rigid circular disc 58 has an annular knife edge near its periphery which engages the arms 62 very near their connection to the arcuate connecting portions 64. The inner ends of arms 62 engage the head 44 of the adjustment screw 42 mounted in the inner end of valve stem 32.

The outer face of disc 51 is provided with a hemispherical boss 66 which engages the free end of an operating lever 68, the lever 68 being pivoted at its other end on the hemispherical end of a threadedly adjustable rod 70. Lever 68 is further provided with an intermediate hemispherical boss 72 formed on its outer surface which is engaged by the inner end of an actuating rod 74. The rod 74 and the surrounding tube 76, which are connected at their outer ends, comprise a conventional rod and tube type temperature responsive actuator which is connected at its inner end by the threaded engagement of the inner end of tube 74 in the externally threaded mounting boss 78 formed on the rear face of rear cover plate 14.

The rod and tube are adapted to extend into a hot water tank when the entire device is attached to a tank by threaded engagement of the boss on the water tank. The rod 74 is constructed of metal having low thermal expansion and the surrounding tube 76 is constructed of metal having high thermal expansion, such as copper. A sleeve 80 of pliable, synthetic plastic material protects the sleeve 76 from corrosive elements in the water.

IN OPERATION

When the temperature of the water surrounding the tube 76 decreases slightly below that which is desired to be maintained, the tube contracts at a considerably higher rate than does the rod 74, and, therefore, the rod moves inward and imparts inward movement to disc 51 through the lever 68, which effects the over-center snap action of disc 52 and its engagement of its central portion with slidable disc 58. This action moves disc 58 inward and effects, through the multiplying arms 62, the opening of valve 28 an initial amount against valve biasing spring 30, as shown in FIG. 2. When valve 28 is in this initial open position, it will permit the flow metered by the holes 54 in disc 48 to pass unrestricted thereby from inlet passage 18 to outlet passage 24.

If the draw off of hot water from the tank is such that the temperature of the water ambient to tube 76 is decreased considerably more than that required to effect the over-center snap action of disc 53 and the initial opening of valve 28, a further inward movement of actuator rod 74 will occur and the disc 53 will be flexed further beyond the position it assumes against the bias of valve spring 30 as it is snapped through center. This further flexing of disc 53 will result in a further opening movement of valve 28, and it will result in the engagement of collar 56 with disc 48 and the outward movement of disc 48 from its biased position against the surface 46, as indicated in FIG. 3.

The further opening movement of valve 28 beyond its initial opening and the axial movement of disc 48 from its normal biased position to a less restricting position is gradual and proportional to the temperature change so that the flow through the device is modulated as the temperature varies in a range below that which effected the snap action of the disc 53. When in the further opening movement of valve 28 the collar 56 engages perforated disc 48, the disc and valve will move outward together. Due to the fact that the valve 28 and its seat 26 are of larger diameter than the bore 20 and disc 48 and due to the fact that the initial opening movement of the valve 28 is sufficient so that the perforations 54 are controlling or metering the flow when disc 48 is in its normal biased position, it will be seen that the disc 48 controls the flow under all conditions when valve 28 is open.

In the modification shown in FIGS. 9 to 11, an imperforate disc 82 of smaller diameter than the bore 20 is substituted for the disc 48 of FIGS. 1 to 8. The disc 82 is threadedly engaged on valve stem 32 for adjustment thereon and normally enters the bore 20 and remains entered in bore 20 when the valve is opened to an initial open position by the over-center snap action of disc 53, as shown in FIG. 10. The difference in the diameters of disc 82 and the bore 20 permits a predetermined flow through bore 20 when the valve 28 is opened to an initial open position. When a further decrease in water temperature causes further proportionate opening of valve 28, the disc 82 is moved outward from the end of bore 20 to permit increased flow, as indicated in FIG. 11. The axially movable disc 82, like the axially movable disc 48, controls or meters the flow under all conditions when the valve 28 is open.

When the temperature of the water being heated by combustion of the gas flowing through the device increases, the valve 28 will move gradually from its position in FIGS. 3, 8, and 11 toward a closed position with increasing water temperature, and the disc 48 of FIG. 3 and disc 82 of FIG. 11 will gradually reduce the flow as they approach a predetermined relationship with the open end of bore 20. When disc 48 engages the surface 46 and disc 82 enters the bore 20 no further reduction in flow is effected, and a predetermined closely controlled flow occurs until the water temperature rises sufficiently and the tube 76 of the rod and tube device expands sufficiently to permit the snap disc to snap through center and return to its normal position of FIGS. 1 and 9. When this occurs the valve 28 will also close rapidly under the bias of spring 30.

When the drop in water temperature below that selected to be maintained is relatively small, the valve 28 will only be moved to its initial open position, as shown in FIGS. 2 and 10, by the over-center snap action of disc 53 and a closely controlled predetermined flow will be metered by disc 48 or 82 in their normally biased positions. When the selected water temperature is restored the valve 28 will again snap closed.

The threadedly adjustable rod 70 which forms a pivot for lever 68 at one end thereof extends exteriorly of the casing at its other end and is provided with an adjustment knob 71. Turning knob 71 in a direction to move the rod 70 toward the right with reference to FIGS. 1 and 9 effects the snap action opening of valve 28 at a higher water temperature, whereby a higher water temperature will be maintained. It will be understod that the collar 56 on the valve stem 32, in FIGS. 1, 2, and 3, may be made threadedly adjustable on the valve stem and the use of such construction is contemplated.

I claim:

1. In a thermostatic gas valve, a body member having a fluid passageway therein, an annular valve seating surface surrounding an end of said passageway, a biased closed poppet valve cooperating with said seating surface, a thermostatic valve actuator, over-center snap action means between said actuator and said valve operative to move said valve to a partially open position in a snap acting manner when said thermostatic actuator responds to a decrease in temperature, and said snap action means further forming an operative connection between said actuator and valve to effect further gradual opening of said valve beyond said partially open position when said actuator responds to further decreasing temperature, throttling means on the passageway side of said valve movable axially with respect to said end of said passageway and operative to permit increased flow as it is moved axially outward from said end of said passageway and being further operative to limit the flow to a predetermined amount when in its most restrictive inner position, and means operatively connecting said throttling means and said valve to cause said throttling means to be moved outward from the end of said passageway with said valve when said valve is moved further openward beyond its said partially open position and after said valve has been moved a slight amount beyond its said partially open position.

2. A gas valve as set forth in claim 1 in which said flow limiting means is a member normally extending into and axially movable in said passageway and maintains a constant predetermined flow therethrough as it is moved axially therein and permits increased flow through said passageway as it is moved outward from the face of said body surrounding the end of said passageway, and in which said member is connected to said valve and is moved outward with said valve sufficiently to permit increased flow through said passageway only when said valve is moved openward beyond its said partial open position.

3. A thermostatic gas valve as set forth in claim 1 in which said means variably limiting the flow through said passageway comprises a perforated disc overlying the end of said passageway, said disc being biased against the surface of said valve body surrounding said end of said passageway, and said disc being engaged by said valve and moved outward from said surface at the end of said passageway by said valve as said valve is moved further openward beyond said partially open position.

References Cited
UNITED STATES PATENTS

| | | | |
|---|---|---|---|
| 144,097 | 10/1873 | Hille | 137—630.19 |
| 2,526,069 | 10/1950 | Douglas. | |
| 2,814,447 | 11/1957 | Greenamyer | 236—48 |
| 3,118,471 | 1/1964 | Wright | 137—630.19 |
| 3,190,314 | 6/1965 | Visos et al. | 236—48 X |

WILLIAM E. WAYNER, Primary Examiner

U.S. Cl. X.R.

137—614.19; 251—75